(12) United States Patent
Wang

(10) Patent No.: US 9,476,501 B2
(45) Date of Patent: Oct. 25, 2016

(54) GEAR SHIFTER

(71) Applicant: GM Global Technology Operations LLC, Detroit, MI (US)

(72) Inventor: Orson S. Wang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 13/899,463

(22) Filed: May 21, 2013

(65) Prior Publication Data

US 2014/0345412 A1  Nov. 27, 2014

(51) Int. Cl.
*F16H 59/00* (2006.01)
*F16H 59/10* (2006.01)
*F16H 59/02* (2006.01)
*F16H 61/24* (2006.01)

(52) U.S. Cl.
CPC ............ *F16H 59/105* (2013.01); *F16H 59/02* (2013.01); *F16H 61/24* (2013.01); *F16H 2061/243* (2013.01); *F16H 2061/245* (2013.01); *Y10T 74/20085* (2015.01)

(58) Field of Classification Search
CPC .................. Y10T 74/20098; Y10T 74/20067; Y10T 74/20085; Y10T 74/20104; Y10T 74/2011; Y10T 74/20122; Y10T 74/20116; Y10T 74/2014; Y10T 74/20128; Y10T 74/20018; Y10T 74/20159; F16H 2059/0239; F16H 2061/185; F16H 2061/243; F16H 2061/247
See application file for complete search history.

(56) References Cited

U.S. PATENT DOCUMENTS

| | | | |
|---|---|---|---|
| 4,912,997 A * | 4/1990 | Malcolm et al. | 74/335 |
| 4,991,454 A * | 2/1991 | Bulgrien | 74/335 |
| 5,540,114 A * | 7/1996 | Kim | 74/473.3 |
| 6,237,435 B1 * | 5/2001 | Gronhage et al. | 74/471 XY |
| 6,923,083 B2 | 8/2005 | Fujinuma | |
| 2001/0017063 A1 * | 8/2001 | Wildeshaus et al. | 74/473.29 |
| 2002/0028632 A1 | 3/2002 | Shimamoto et al. | |
| 2002/0056334 A1 * | 5/2002 | Fujinuma | 74/473.1 |
| 2003/0098218 A1 * | 5/2003 | Syamoto | 192/220.4 |

(Continued)

FOREIGN PATENT DOCUMENTS

| CN | 101363543 A | 2/2009 |
|---|---|---|
| CN | 101614276 A | 12/2009 |

(Continued)

OTHER PUBLICATIONS

Audi A8 Hybrid picture # 38 of 79, MY 2013, size: 800×600, retrieved on Aug. 16, 2013 from http://photo.netcarshow.com/Audi-A8_Hybrid_2013_photo_26.jpg.

(Continued)

*Primary Examiner* — Victor MacArthur
(74) *Attorney, Agent, or Firm* — Lorenz & Kope, LLP

(57) ABSTRACT

An apparatus for a gear shifter for use with a transmission is provided. The gear shifter includes a housing that defines a gate and a gear shift lever having a first end and a second end. The gear shift lever is at least partially received within the housing so that the first end is guided by the gate. The gear shifter includes a shifter block received within the housing and including a plurality of detents. One of the plurality of detents includes at least one pocket defined adjacent to the one of the plurality of detents so as to be in communication with the one of the plurality of detents. The at least one pocket and the plurality of detents are each sized to receive a portion of the second end of the gear shift lever.

16 Claims, 5 Drawing Sheets

(56) References Cited

U.S. PATENT DOCUMENTS

| | | | |
|---|---|---|---|
| 2005/0028632 A1* | 2/2005 | Giefer et al. | 74/473.1 |
| 2007/0144294 A1* | 6/2007 | Sickart | 74/473.18 |
| 2013/0145887 A1* | 6/2013 | Choi | 74/473.26 |

FOREIGN PATENT DOCUMENTS

| | | |
|---|---|---|
| CN | 202418534 U | 9/2012 |
| CN | 202834023 U | 3/2013 |

OTHER PUBLICATIONS

BMW 1-Series Urban Line picture # 96 of 132, MY 2012, size: 800×600, retrieved on Aug. 16, 2013 from http://photo.netcarshow.com/BMW-1-Series_Urban_Line_2012_photo_60.jpg.

Kia K9 picture # 06 of 07, MY 2013, size: 800×600, retrieved Aug. 16, 2013 from http://photo.netcarshow.com/Kia-K9_2013_photo_06.jpg.

Picture of Mercedes Benz gear shifter retrieved Feb. 14, 2014 from http://www.mbusa.com/mercedes/vehicles/gallery/class-G/bodystyle-SUV#layout=/vehicles/gallery&class=G&bodystyle=SUV&waypoint=gallery-stack&gallery=UNIQUE-GALLERY-ID|1|6.

Mercedes-Benz CLS63 AMG S-Model picture # 10 of 16, MY 2014, size 800×600, retrieved Aug. 16, 2013 from http://photo.netcarshow.com/Mercedes-Benz-CLS63_AMG_S-Model_2014_photo_0a.jpg.

Mercedes-Benz SL550 picture # 68 of 84, MY 2013, size: 800×600, retrieved Aug. 16, 2013 from http://photo.netcarshow.com/Mercedes-Benz-SL550 2013 photo 44.jpg.

Nissan Leaf picture # 70 of 96, MY 2014, size: 1600×1200, retrieved Aug. 16, 2013 from http://photo.netcarshow.com/Nissan-Leaf 2014_photo_46.jpg.

Toyota Prius Plug-in Hybrid picture # 16 of 33, MY 2013, size: 800×600, retrieved Aug. 16, 2013 from http://photo.netcarshow.com/Toyota-Prius_Plug-in_Hybrid_2013_photo_10.jpg.

State Intellectual Property Office of the People's Republic of China, Office Action in Chinese Patent Application No. 2014102153143 mailed Nov. 27, 2015.

* cited by examiner

GEAR SHIFTER

TECHNICAL FIELD

The technical field generally relates to a gear shifter for use with a transmission, and more particularly relates to an improved electronic gear shifter that prevents inadvertent shifting due to a lateral force.

BACKGROUND

Certain motor vehicles include an electronic gear shift device or shifter that enables the user to electronically control the transmission of the motor vehicle. In the case of an electronic gear shifter having a gear shift lever, the manipulation of the gear shift lever can send an electronic signal to the transmission to change a range of the transmission.

During use of the vehicle, lateral forces may be imparted to the gear shift lever of the gear shifter. For example, lateral forces can be applied to the gear shift lever by the user moving objects within the passenger cabin, or from other occupants within the passenger cabin. Accordingly, it is desirable to provide an improved gear shifter, which prevents inadvertent shifting of the transmission due to the application of a lateral force. Furthermore, other desirable features and characteristics of the present invention will become apparent from the subsequent detailed description and the appended claims, taken in conjunction with the accompanying drawings and the foregoing technical field and background.

SUMMARY

An apparatus is provided for a gear shifter for use with a transmission. The gear shifter includes a housing that defines a gate and a gear shift lever having a first end and a second end. The gear shift lever is at least partially received within the housing so that the first end is guided by the gate. The gear shifter includes a shifter block received within the housing and including a plurality of detents. One of the plurality of detents includes at least one pocket defined adjacent to the one of the plurality of detents so as to be in communication with the one of the plurality of detents. The at least one pocket and the plurality of detents are each sized to receive a portion of the second end of the gear shift lever.

Also provided is a vehicle. The vehicle includes a transmission operable over a plurality of ranges and a control module in communication with the transmission to control the operation of the transmission over the plurality of ranges. The vehicle includes a gear shifter. The gear shifter includes a housing that defines a gate, and a gear shift lever having a first end and a second end. The gear shift lever is at least partially received within the housing so that the first end is guided by the gate. The gear shifter further includes at least one sensor in communication with the control module to observe a position of the gear shift lever within the housing and transmit a signal to the control module indicative of a selected range for the operation of the transmission. The gear shifter includes a shifter block received within the housing. The shifter block includes a plurality of detents, with at least two of the plurality of detents corresponding to the selected range for the operation of the transmission and each of the plurality of detents having a distinct height from a bottom surface of the shifter block. One of the plurality of detents corresponds to a null position for the gear shift lever and the one of the plurality of detents includes at least one pocket defined adjacent to the one of the plurality of detents so as to be in communication with the one of the plurality of detents such that the second end of the gear shift lever is movable into the at least one pocket upon an application of a lateral force to the first end of the gear shift lever.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
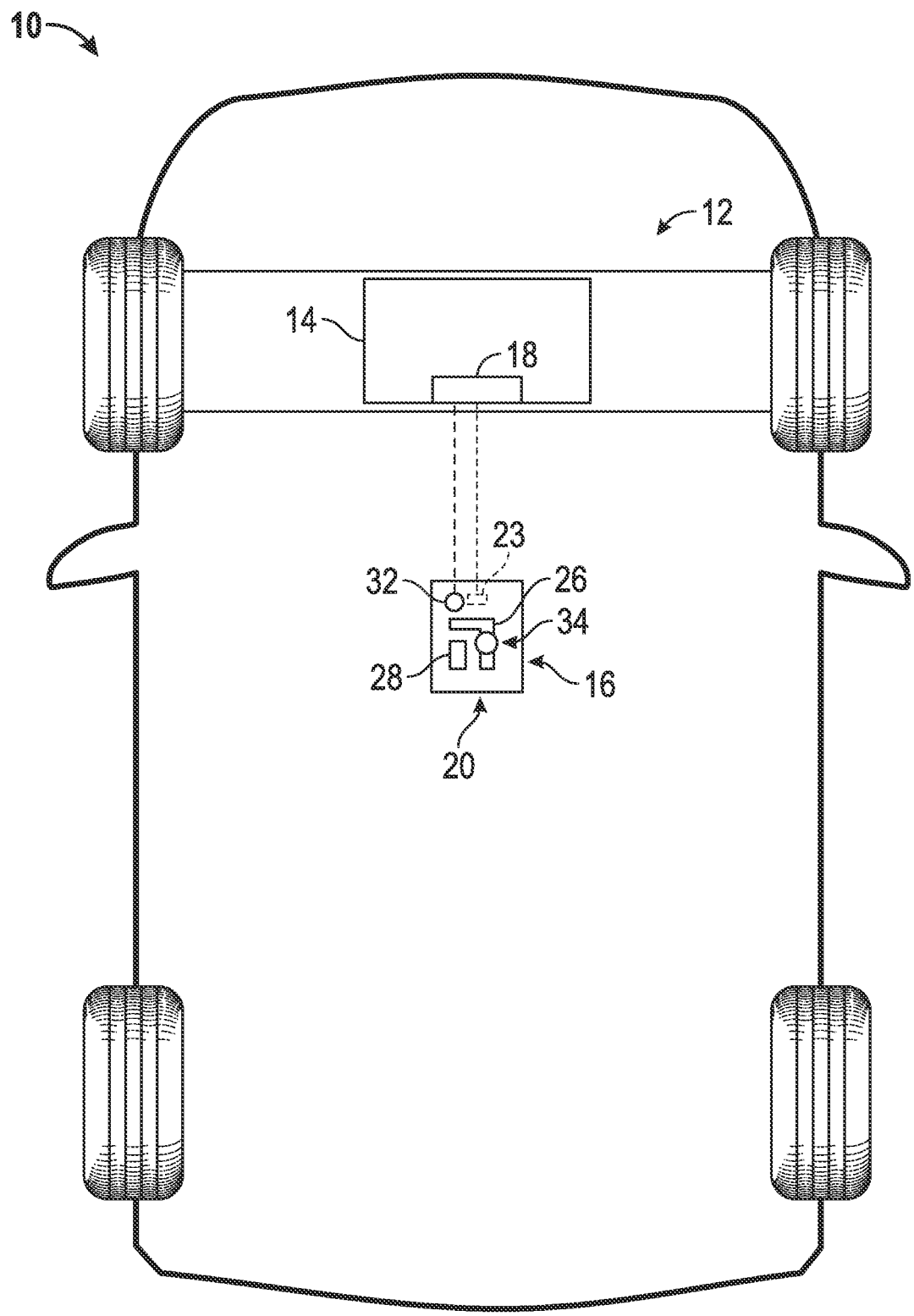
FIG. 1 is a functional block diagram illustrating a vehicle that includes an improved gear shifter in accordance with various embodiments.

With reference to FIG. 1, a simplified functional block diagram of a vehicle 10 is shown. The vehicle 10 can include a powertrain 12 for propulsion. The powertrain 12 can include a propulsion device, which can supply power to a transmission 14. The transmission 14 can transfer this power to a suitable driveline coupled to one or more wheels (and tires) of the vehicle 10 to enable the vehicle 10 to move. As is known to one skilled in the art, the transmission 14 can comprise a suitable gear transmission, which can be operated in a variety of ranges containing one or more gears, including, but not limited to a park range, a neutral range, a reverse range, a drive range, etc. In one example, the transmission 14 can be a shift-by-wire transmission, in which user input to a shifter 16 is transmitted to a control module 18, and the control module 18 generates signals to control the operation of the transmission 14 in one or more gears of the selected range based on the user input.

Figure 2:
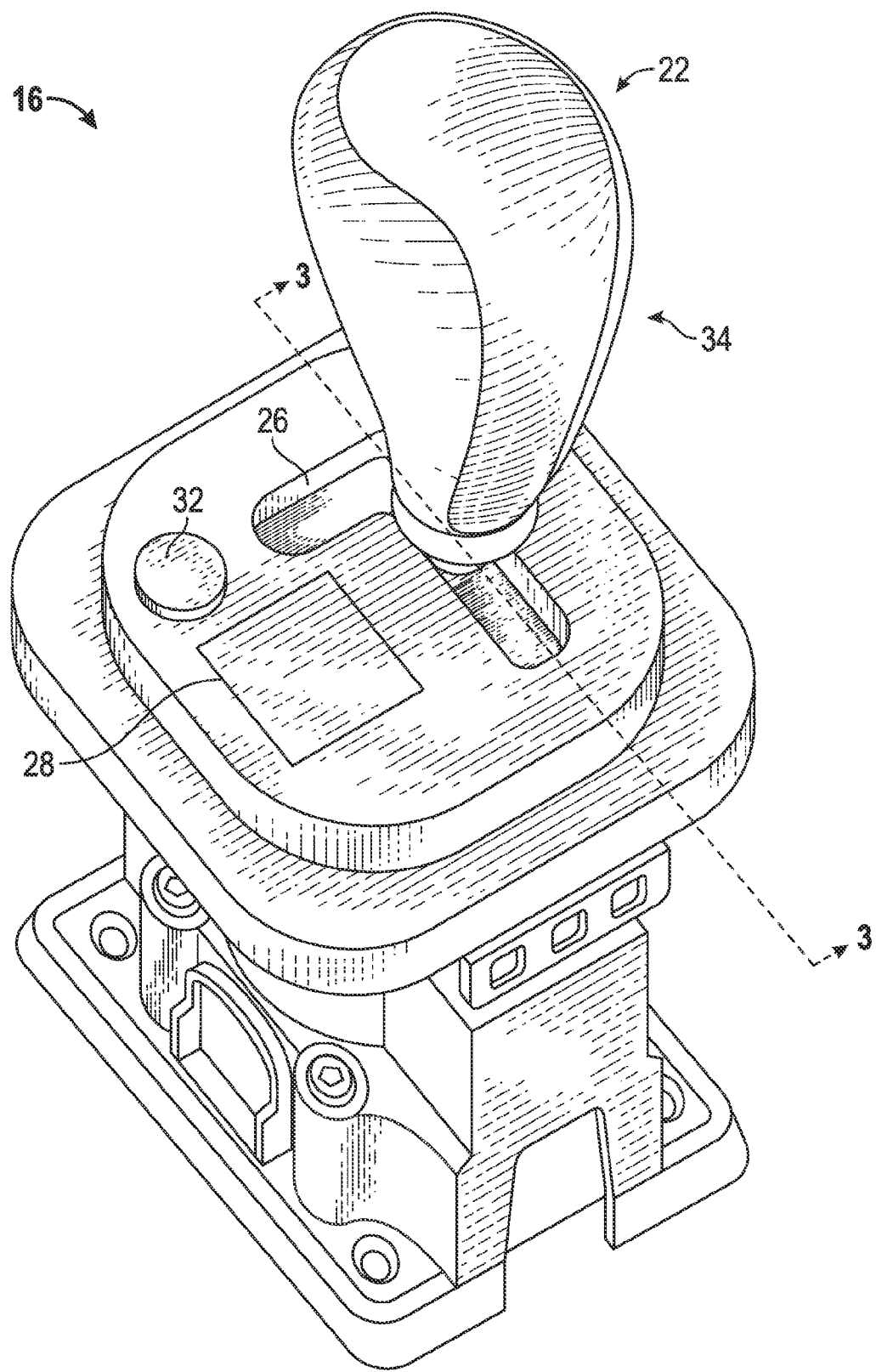
FIG. 2 is a perspective view of the gear shifter of FIG. 1 in accordance with various embodiments.
Figure 3:
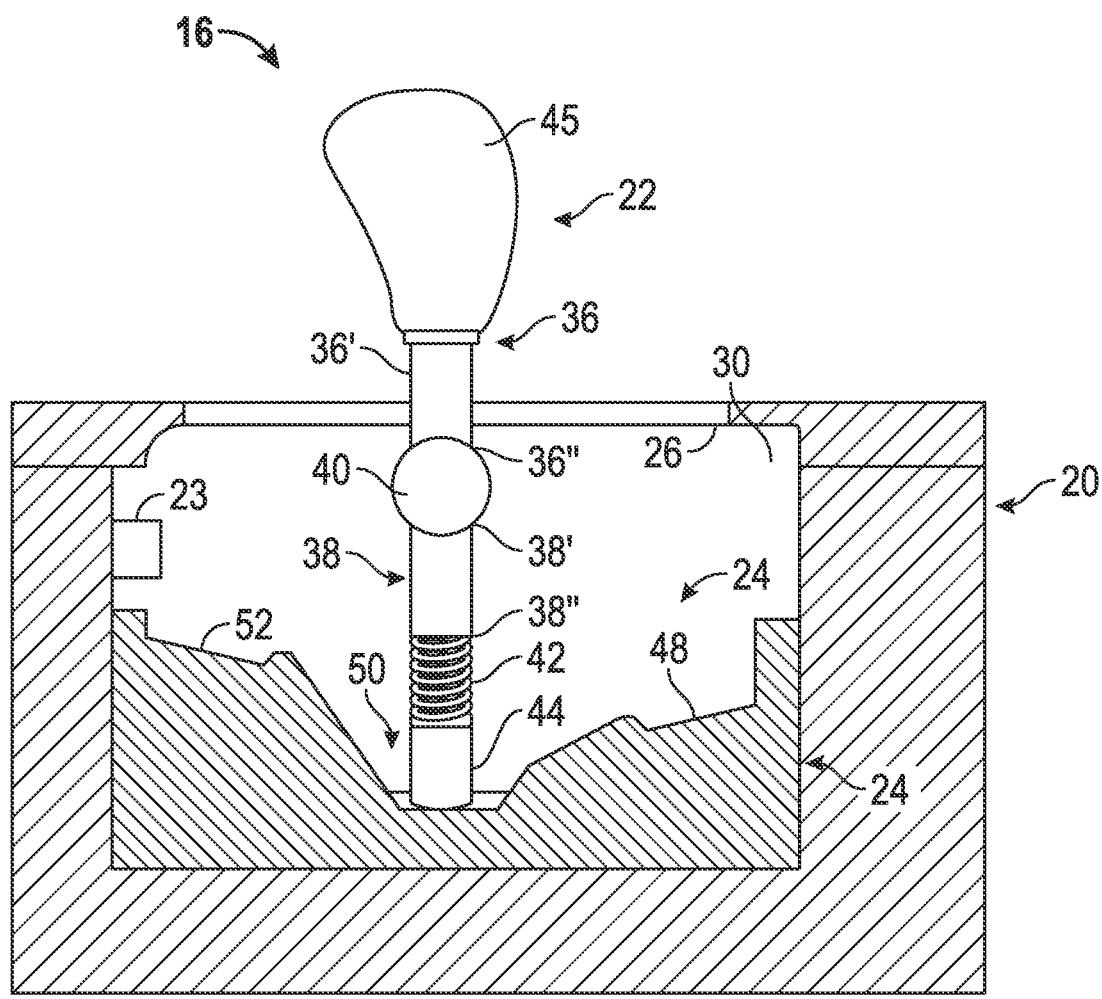
FIG. 3 is a cross-sectional view of the gear shifter of FIG. 2, taken along line 3-3 of FIG. 2.

With reference to FIGS. 2 and 3, an exemplary shifter 16 for use with the transmission 14 is shown. In this embodiment, the shifter 16 can include a housing 20, one or more range selection input devices 22, at least one sensor 23 (FIG. 3) and a shifter block 24 (FIG. 3). The housing 20 can include a gate 26, a visual range indicator 28 and can define a cavity 30 for receipt of the shifter block 24 (FIG. 3). In one example, the housing 20 can comprise a multi-piece component, however, the housing 20 can be integrally formed. The housing 20 can be coupled to the vehicle 10 to secure the shifter 16 to the vehicle 10.

With reference to FIG. 2, the gate 26 can be shaped to guide the movement of one of the range selection input devices 22 relative to the shifter block 24. In one example, the gate 26 can be substantially L-shaped, however, the gate 26 can have any desired shape, including, but not limited to, a straight line, substantially T-shaped, etc. In addition, as is generally known, the gate 26 can also include one or more protective devices, which can substantially surround the one of the range selection input devices 22 to prevent debris from entering the cavity 30.

The visual range indicator 28 can be positioned next to the gate 26, and can be coupled to the housing 20, to illustrate or notify the user of the ranges available for selection and the location of the ranges. In one example, the visual range indicator 28 can comprise text, such as "R" for reverse range, "N" for neutral range, "." for a null or rest position and "D" for drive range. It should be noted, however, the visual range indicator 28 can include, but is not limited to, a graphical representation, a backlit light emitting diode (LED) display, and any suitable combination thereof. Further, it should be noted that the visual range indicator 28 need not be coupled to the housing 20, but the visual range indicator 28 can be disposed at any suitable location within the vehicle 10.

The one or more range selection input devices 22 can enable the user to select a desired range for the operation of the transmission 14. In one example, the one or more range selection input devices 22 can include a park button 32 and a gear shift lever 34. The park button 32 can be in communication with the control module 18, and when a user input is received, the park button 32 can output a signal that the user desires the transmission 14 to be operated in a park range. It should be noted that the use of a button is merely exemplary, as any suitable user input device could be used for the selection of the park range, including, but not limited to, a rotatable knob, toggle switch, etc. In one example, the park button 32 can include an indicator 32'. The indicator 32' can indicate the range for the operation of the transmission 14 selectable via the park button 32, and can comprise a textual or graphical indicator. For example, the indicator 32' can comprise a "P." In addition, the park button 32 can have a color that can be different than a color of the housing 20, which can aide in the user identifying the park button 32. It should be noted that the use of a button for the park range is merely exemplary, as other ranges for the operation of the transmission 14 could be selected via a similar user input device.

The gear shift lever 34 is schematically illustrated in FIG. 3. In one embodiment, the gear shift lever 34 can include a first, lever portion 36, a second portion 38, a pivot 40, a biasing member or spring 42 and a bullet or cam 44. It should be noted that this embodiment of the gear shift lever 34 is merely exemplary, as any suitable gear shift lever can cooperate with the shifter block 24 to enable the selection of a desired range for the operation of the transmission 14. In this embodiment, the lever portion 36 can be sized to extend beyond a surface of the housing 20, to enable the user to manipulate the gear shift lever 34. The lever portion 36 can include a graspable portion 45 at a first end 36' and can be pivotally coupled to the second portion 38 via the pivot 40 at a second end 36". The second portion 38 can be coupled to the pivot 40 at a first end 38' and coupled to the spring 42 at a second end 38". The spring 42 can bias against the cam 44 to aid in the movement of the cam 44 along the shifter block 24, as will be discussed in greater detail herein.

With reference to FIG. 3, the at least one sensor 23 can be positioned within the cavity 30 of the housing 20, and can be used to determine a selected range for the transmission 14. In one example, the at least one sensor 23 can comprise at least one sensor for detecting a position of the gear shift lever 34 within the cavity 30 of the housing 20. In this regard, the at least one sensor 23 can observe the position of at least a portion of the gear shift lever 34, and generate signals based thereon. The signals generated by the at least one sensor 23 can be transmitted to the control module 18 through any suitable communication architecture, such as over a bus. As each range selectable by the gear shift lever 34 can correspond to a particular position of the gear shift lever 34, the control module 18 can analyze the signals from the at least one sensor 23 and determine the range selected by the user via the gear shift lever 34.

Figure 4:
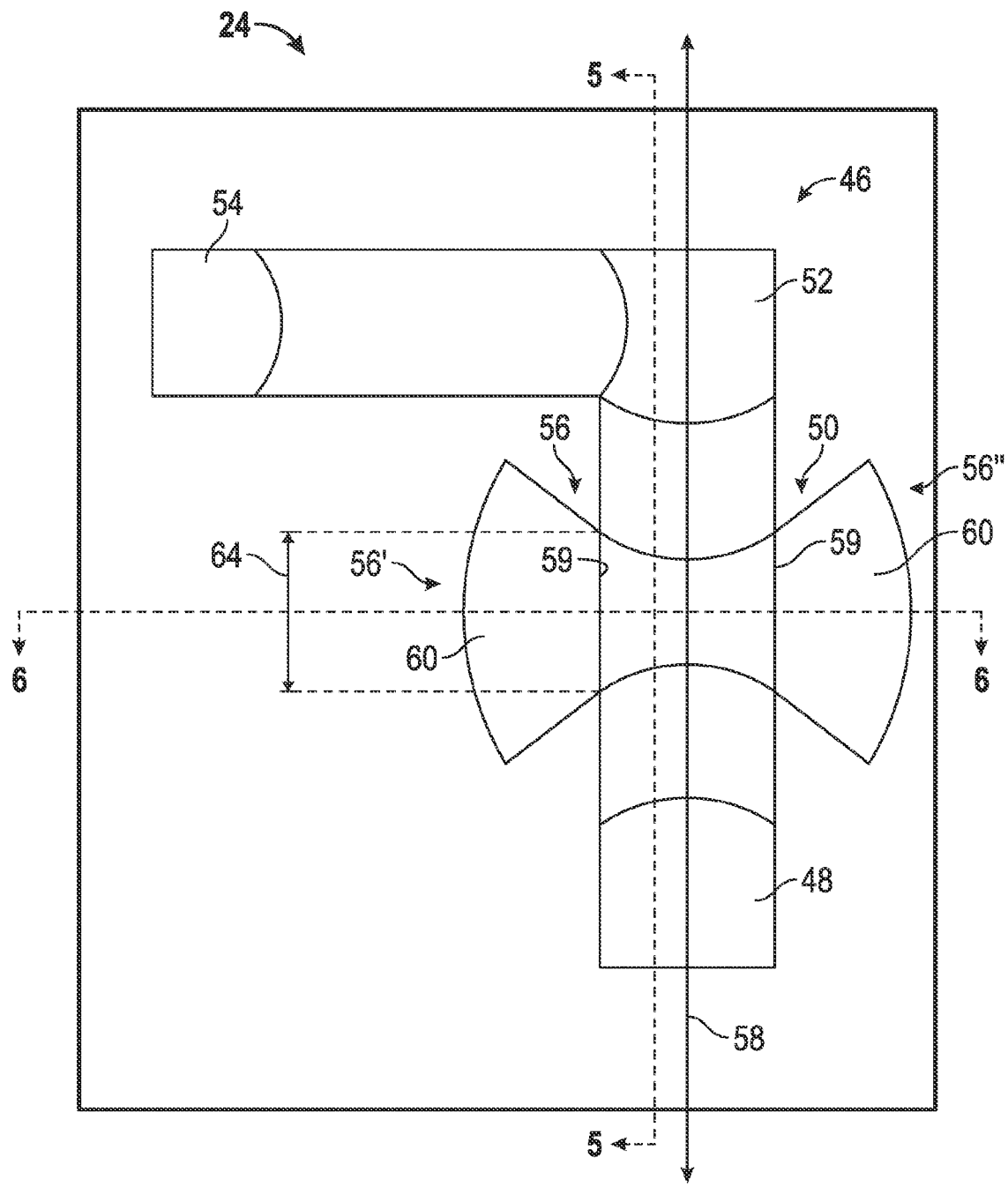
FIG. 4 is top view of a shifter block of the gear shifter of FIG. 2.
Figure 5:
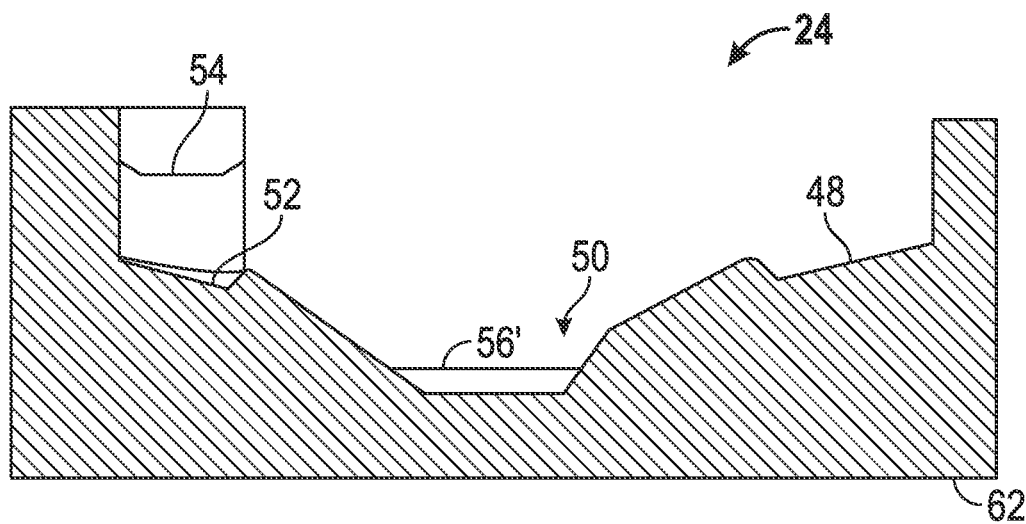
FIG. 5 is a cross-sectional view of the shifter block of FIG. 4, taken along line 5-5 of FIG. 4.

With continued reference to FIG. 3, and with additional reference to FIG. 4, the shifter block 24 can include a plurality of detents 46 which can be orientated at different positions or heights, as shown in FIG. 5. The plurality of detents 46 can be formed in the shifter block 24 through any suitable technique, including, but not limited to, molding, cutting, carving, etching, etc. The plurality of detents 46 can be arranged in a substantially L-shape, however, the plurality of detents 46 can be arranged in any desired shape, including, but not limited to, a straight line, substantially T-shaped, etc. Generally, the arrangement of the plurality of detents 46 can correspond with the shape of the gate 26. In one example, the shifter block 24 can include a first or drive detent 48 that corresponds with a "drive" range for the transmission 14, a second or null detent 50 which does not correspond with a range for the transmission 14, a third or neutral detent 52 that corresponds with a "neutral" range for the transmission 14 and a fourth or reverse detent 54 that corresponds with a "reverse" range for the transmission 14. Generally, each of the plurality of detents 46 can be sized to enable the receipt of the cam 44 to enable the selection of the associated range for the transmission 14.

The null detent 50 can comprise a rest position for the gear shift lever 34 or a position in which the gear shift lever 34 returns after the selection of at least the "neutral" range or the "drive" range. Generally, each of the drive detent 48, neutral detent 52 and reverse detent 54 can be at a height that is greater than the null detent 50 such that the spring 42 is compressed against the cam 44 to enable the selection of one of the drive detent 48, neutral detent 52 and reverse detent 54, and upon removal of force from the gear shift lever 34 after the selection of the range, the spring 42 expands to move the cam 44 back into the null detent 50.

In one example, as shown in FIG. 5, the drive detent 48 can have a height from a bottom surface 62 of the shifter block 24, which can be greater than a height of the neutral detent 52 from the bottom surface 62 of the shifter block 24. The reverse detent 54 can have a height from the bottom surface 62 of the shifter block 24 that can be greater than both the neutral detent 52 and the drive detent 48. The null detent 50 can have a height from the bottom surface 62, which can be less than the height of the drive detent 48, neutral detent 52 and the reverse detent 54.

Figure 6:
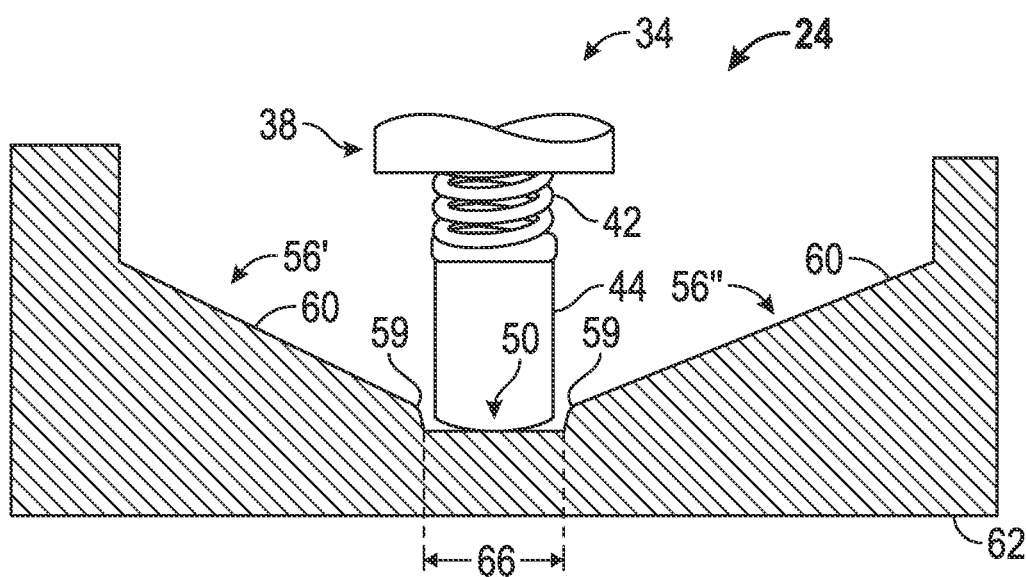
FIG. 6 is schematic cross-sectional illustration of the shifter block of FIG. 4, taken along line 6-6 of FIG. 4, and including a portion of a gear shift lever of FIG. 3.

With reference to FIGS. 4 and 6, the null detent 50 can include at least one pocket 56. The at least one pocket 56 can be defined adjacent to the null detent 50 so as to be in communication with the null detent 50. The at least one pocket 56 can capture the cam 44 in the case of the application of a lateral force to the gear shift lever 34 when the gear shift lever 34 is in the null detent 50. Thus, the at least one pocket 56 can prevent the gear shift lever 34 from inadvertently being moved into the neutral detent 52 or reverse detent 54 upon the application of a lateral force to the gear shift lever 34. In one example, the at least one pocket 56 can comprise a first pocket 56' and a second pocket 56". Generally, the pockets 56', 56" can be formed on opposite sides of the null detent 50 so as to be symmetrical with respect to a longitudinal axis 58 of the plurality of detents 46, however, the pockets 56', 56" could be formed so as to be offset relative to each other about the longitudinal axis 58, if desired. In addition, the at least one pocket 56 could comprise a single pocket, which can be formed on either side of the null detent 50. Furthermore, the pockets 56", 56" can be formed at other detents of the plurality of detents 46, and thus, the pockets 56", 56" need not be limited to the null detent 50 and the configuration shown.

The pockets 56', 56" can have any suitable shape to facilitate the capture of the cam 44 when a lateral force is applied to the gear shift lever 34. Generally, the pockets 56', 56" can be shaped so as to not interfere with intentional shifts, while capturing the cam 44 during the application of unintentional lateral forces. In this example, each of the pockets 56', 56" have a substantially conical shape, with an opening 59 that leads to an upwardly, positive sloped or ramped surface 60 (FIG. 6). The opening 59 can be sized to receive at least the cam 44 during the application of a lateral force. Generally, the opening 59 can have a length 64 (FIG. 4) that is at least greater than a width 66 of the cam 44 (FIG. 6) to enable the cam 44 to be received within the pockets 56", 56".

The ramped surfaces 60 can extend outwardly from the openings 59. The use of the ramped surfaces 60 can aid in the absorption of the lateral force, as the increasing slope of the ramped surfaces 60 can require additional compression of the spring 42. In addition, the increasing slope of the ramped surfaces 60 can also cooperate with the spring 42 to move the cam 44 back to the null detent 50 upon removal of the lateral force. The slope of the ramped surfaces 60 from the null detent 50 can vary in order to require a desired force threshold to move the cam 44 into the pockets 56', 56".

In one example, the ramped surfaces 60 can be formed at an angle between about 0° to about 90° relative to the bottom surface 62 of the shifter block 24. Thus, the surfaces of the pockets 56; 56" can be flat, if desired. Further, if the ramped surfaces 60 are formed at an angle of about 90° relative to the bottom surface 62 of the shifter block 24, then the ramped surfaces 60 can serve as blocking walls. Generally, the ramped surfaces 60 can be formed at an angle between about 10° to about 40° relative to the bottom surface 62 of the shifter block 24. The angle of the ramped surfaces 60 relative to the bottom surface 62 of the shifter block 24 can be selected to cooperate with a stiffness of the spring 42. For example, in the case of a spring 42 having a large stiffness (i.e. a stiff spring), the ramped surfaces 60 can be formed with a shallow angle, such as between about 10° to about 25° relative to the bottom surface 62 of the shifter block 24. Generally, the angle of the ramped surfaces 60 relative to the bottom surface 62 of the shifter block 24 can be selected such that the effort to enter the pockets 56', 56" is either the same or easier than the effort needed to move between the plurality of detents 46.

It should be noted that the shape of the pockets 56", 56" is merely exemplary, as the pockets 56', 56" can have any desired shape to capture the gear shift lever 34 during the inadvertent application of a lateral force. For example, the pockets 56", 56" can be substantially rectangular in shape, substantially arcuate, circular or hemispherical in shape, substantially triangular in shape, or can have any other suitable polygonal shape to facilitate the capture of the cam 44.

With the plurality of detents 46 formed in the shifter block 24, and the shifter block 24 and gear shift lever 34 assembled within the housing 20 and coupled to the control module 18, the gear shift lever 34 can be used to select one or more ranges for the transmission 14. For example, with the cam 44 of the gear shift lever 34 in the null detent 50, in order to select the "drive" range, the gear shift lever 34 can be moved within the gate 26 to the drive range as indicated by the visual range indicator 28. The movement of the gear shift lever 34 can cause the cam 44 to follow along the plurality of detents 46 to the drive detent 48. The movement of the cam 44 into the drive detent 48 can compress the spring 42, such that after the "drive" range is selected and the force is removed from the gear shift lever 34, the spring 42 can expand, and move the cam 44 towards the null detent 50. The movement of the cam 44 towards the null detent 50 can move the gear shift lever 34 into the "null" position.

With the cam 44 in the null detent 50, if an occupant of the vehicle 10 applies a lateral force to the gear shift lever 34, for example, by reaching for an item in the passenger cabin, the application of the lateral force to the gear shift lever 34 can cause the cam 44 to move into a respective one of the pockets 56", 56". Thus, the pockets 56', 56" can prevent the cam 44 from inadvertently moving into an adjacent detent, such as the neutral detent 52 or the drive detent 48.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claim and the legal equivalents thereof.

What is claimed is:

1. A gear shifter for use with a transmission, comprising:
a housing that defines a gate;
a gear shift lever having a first end and a second end, the gear shift lever at least partially received within the housing so that the first end is guided by the gate, the gear shift lever movable to select a range for operation of the transmission, the gear shift lever including a biasing member; and
a shifter block received within the housing and including a plurality of detents, with one of the plurality of detents corresponding to a null position for the gear shift lever and a remainder of the plurality of detents corresponding to a selected range for the transmission, the one of the plurality of detents including a pair of pockets defined on opposite sides of the one of the plurality of detents so as to be in communication with the one of the plurality of detents, the pair of pockets inhibit a selection of the range for the operation of the transmission, the pair of pockets and the plurality of detents each sized to receive a portion of the second end of the gear shift lever, and an opening of each of the pair of pockets leads to a flat surface having a positive slope that cooperates with the biasing member to move the gear shift lever back to the one of the plurality of detents upon removal of a lateral force, wherein each of the plurality of detents has a distinct height from a bottom surface of the shifter block and the positive slope is defined relative to the bottom surface of the shifter block, the one of the plurality of detents has a height from the bottom surface of the shifter block that is less than heights of a remainder of the plurality of detents and the remainder of the plurality of detents correspond to a reverse range, a drive range and a neutral range, with the null position defined between the drive range and the neutral range.

2. The gear shifter of claim 1, wherein a majority of the plurality of detents extend along a longitudinal axis, and the pair of pockets are substantially symmetrical about the longitudinal axis.

3. The gear shifter of claim 2, wherein the opening is sized to receive at least a portion of the second end of the gear shift lever.

4. The gear shifter of claim 1, wherein the flat surface of each of the pair of pockets is formed at an angle between about 10 degrees to about 40 degrees relative to a bottom surface of the shifter block.

5. A gear shifter for use with a transmission, comprising:
a housing that defines a gate;
a gear shift lever having a first end and a second end, the gear shift lever at least partially received within the housing so that the first end is guided by the gate, the gear shift lever movable to select a range for operation of the transmission, the gear shift lever including a biasing member; and
a shifter block received within the housing and including a first detent that corresponds to a neutral range for the operation of the transmission, a second detent that corresponds to a drive range for the operation of the transmission, and a third detent that corresponds to a null position for the gear shift lever, the third detent defined between the first detent and the second detent along a longitudinal axis, the third detent including a pair of pockets defined on opposite sides of the third detent, each pocket of the pair of pockets in communication with the third detent with an opening such that the second end of the gear shift lever is movable into one of the pair of pockets upon an application of a lateral force to the first end of the gear shift lever, the pair of pockets inhibit a selection of the range for the operation of the transmission and the opening of each of the pair of pockets leading to a flat surface having a positive slope that cooperates with the biasing member to move the gear shift lever back to the one of the plurality of detents upon removal of the lateral force.

6. The gear shifter of claim 5, wherein each of the first detent, the second detent and the third detent has a distinct height from a bottom surface of the shifter block.

7. The gear shifter of claim 6, wherein the third detent has a height from the bottom surface of the shifter block that is less than heights of the first detent and the second detent.

8. The gear shifter of claim 6, wherein the flat surface of each of the pair of pockets is formed at an angle between about 10 degrees to about 40 degrees relative to the bottom surface of the shifter block.

9. The gear shifter of claim 5, wherein the pair of pockets are substantially symmetrical about the longitudinal axis.

10. The gear shifter of claim 9, wherein the opening is sized to receive at least a portion of the second end of the gear shift lever.

11. The gear shifter of claim 10, wherein the flat surface extends outwardly from the opening such that the pair of pockets have a substantially triangular shape.

12. A vehicle, comprising:
a transmission operable over a plurality of ranges;
a control module in communication with the transmission to control the operation of the transmission over the plurality of ranges; and
a gear shifter including:
a housing that defines a gate;
a gear shift lever having a first end and a second end, the gear shift lever at least partially received within the housing so that the first end is guided by the gate, the gear shift lever movable to select a range for the operation of the transmission and the gear shift lever includes a biasing member near the second end;
at least one sensor in communication with the control module to observe a position of the gear shift lever within the housing and transmit a signal to the control module indicative of a selected range for the operation of the transmission; and
a shifter block received within the housing and including a first detent that corresponds to a neutral range for the operation of the transmission, a second detent that corresponds to a drive range for the operation of the transmission, and a third detent that corresponds to a null position for the gear shift lever, the third detent defined between the first detent and the second detent along a longitudinal axis, the first detent having a first height from a bottom surface of the shifter block, the second detent having a second height from the bottom surface of the shifter block and the third detent having a third height from the bottom surface of the shifter block, each of the first height, the second height and the third height are different, and the third detent includes at least one pocket defined along a side of the third detent so as to be in communication with the third detent such that the second end of the gear shift lever is movable into the at least one pocket based on a lateral force to the first end of the gear shift lever, the at least one pocket inhibits a selection of the range for the operation of the transmission and the at least one pocket leads to a flat surface having a positive slope relative to the bottom surface of the shifter block that cooperates with the biasing member to move the gear shift lever back to the third detent upon removal of the lateral force.

13. The vehicle of claim 12, wherein the first detent, the second detent and the third detent extend along a longitudinal axis, and the at least one pocket further comprises two pockets formed on opposite sides of the third detent so as to be substantially symmetrical about the longitudinal axis.

14. The vehicle of claim 12, wherein the shifter block further comprises a fourth detent that corresponds to the a reverse range for the operation of the transmission, the fourth detent having a fourth height from the bottom surface of the shifter block that is different than the first height, the second height and the third height, and the first detent, the second detent, the third detent and the fourth detent are defined in the shifter block to have a substantially L-shape.

15. The vehicle of claim 12, further comprising a user input device coupled to the housing and in communication with the control module that receives user input to select a range for the transmission.

16. The vehicle of claim 15, wherein the user input device is actuatable to select a park range for the transmission.

* * * * *